METHOD OF MAKING GRAVURE RELIEF IMAGES

Filed April 24, 1963 3 Sheets-Sheet 1

INVENTORS
EDWIN VELTEN
JEROME R. HARRIS
BY
Amster + Levy
ATTORNEYS

METHOD OF MAKING GRAVURE RELIEF IMAGES

Filed April 24, 1963 3 Sheets-Sheet 2

INVENTORS
EDWIN VELTEN
JEROME R. HARRIS
BY
Amster & Levy
ATTORNEYS

METHOD OF MAKING GRAVURE RELIEF IMAGES

Filed April 24, 1963 3 Sheets-Sheet 3

INVENTORS
EDWIN VELTEN
JEROME R. HARRIS
BY Amster & Levy
ATTORNEYS

United States Patent Office 3,179,519

Patented Apr. 20, 1965

3,179,519

METHOD OF MAKING GRAVURE RELIEF IMAGES

Edwin Velten and Jerome R. Harris, North Plainfield, N.J., assignors to Art Color Printing Company, Dunellen, N.J., a corporation of New Jersey Filed Apr. 24, 1963, Ser. No. 275,317
17 Claims. (Cl. 96—35)

The present invention relates generally to a method for producing printing cylinders or plates, and in particular to a method for preparing a gravure etching resist for a gravure cylinder from continuous tone and line copy.

Of recent times, there has been introduced a photographic material which is both a photographic film and a gravure etching resist. Such gravure etching resist is suitable for a wide variety of gravure processes that theretofore had used carbon tissue, including the so-called single positive method and various half-tone methods, utilizing both continuous tone and half-tone positives. The gravure etching resist includes essentially three layers, namely an emulsion which is to be laid down against the printing cylinder or plate and having a gelatin layer containing an orthochromatic sensitized silver halide, a membrane which serves as a waterproof protective layer during laydown of the resist on the copper and is removed by a solvent prior to hot water development, and a strippable film base support of polyester which is backed with a red anti-halation layer. Such gravure resists are available from a number of sources, including E. I. du Pont de Nemours & Co. under the Cronar Rotofilm trademark and a similar material made by Gevaert, under its Rotargo trademark.

Gelatin tanning or hardening takes place during photographic development; and such tanning or hardening of the emulsion or gelatin is proportional to the amount of silver density developed. Thus, in high density areas, penetration of the etching solution or irons are slowest and these areas become the highlights of the final printed impression.

The etching resist is laid down on the printing cylinder or plate is essentially the same manner as carbon tissue and then the film base support including the anti-halation layer is peeled off, leaving the developed emulsion protected by the thin waterproof protective membrane. Just prior to the hot water development of the etching resist, the protective membrane is removed by flushing with an appropriate solvent. Etching of the printing cylinder or plate is performed with the customary gravure etchants or irons in a manner similar to but somewhat more simple than employed with the carbon tissue since a higher degree of standardization may be realized by the use of such gravure etching resist.

The gravure etching resist may be exposed in a conventional vacuum back or frame, the exposure usually being made of a single sheet at a time or in multiples. Usually, such exposure includes a first or screen exposure which will establish the cell walls after appropriate development and a second or tone exposure to expose the photosensitive resist in a negative image in direct proportion to the tonal values of the continuous tone copy and to the line copy. The expression "line copy" as used herein is intended to include both type and line drawings or representations. The exposure times and techniques will vary in accordance with the densities of the positive copy. Following the exposure, the photosensitive resist material is developed, fixed and dried in accordance with techniques which are generally well understood and described in the literature.

There exists a need for improved methods for the exposure of such gravure etching resist to continuous tone copy and line copy to obtain good tonal values for the continuous tone copy and a sufficiently deep etch for the retention of the type and other line material in the subsequent gravure etching procedure. Such process should be relatively simple and easily reproducible such as to lend itself to the mass production processing of gravure etching resists for gravure cylinders and the like.

Broadly, it is an object of the present invention to provide an improved method for preparing a gravure etching resist for a gravure cylinder or plate from a combined photographic film and gravure etching resist. Specifically, it is within the contemplation of the present invention to provide a technique for preparing gravure etching resists which assures a high degree of standardization and materially simplifies the processing of gravure cylinders and printing plates.

In accordance with an illustrative method demonstrating objects and features of the present invention, the continuous tone copy in the form of a reflective positive print which is known in the trade as a velox and line copy are mounted in proper registry relative to each other, with at least the continuous tone reflective copy on a fluorescent background at a copying plane and with the photosensitive gravure etching resist at an exposure plane spaced from the copying plane. The copy is exposed to a white light source having a high content in the ultra-violet and near ultra-violet portions of the spectrum to fully expose the photosensitive gravure etching resist in a negative image in direct proportion to the tonal values of the continuous tone reflective copy and to partially expose the etching resist in a drop-out region corresponding to the fluorescent background. A filter is placed between the copying plane and the exposure plane to cut off reflected light from the copying plane in the ultra-violet and near ultra-violet portions of the spectrum whereupon the continuous tone reflective copy and the fluorescent background is again exposed, but to a substantially pure ultra-violet light source. Such ultra-violet light is absorbed on the fluorescent background and re-radiated in a different portion of the spectrum such that the reflected light output passes through the filter and fully exposes the etching resist in the drop-out region to provide a negative image of the line copy. The reflected light from the continuous tone copy experiences no frequency change and is blocked by the filter and precluded from further exposing the etching resist at the exposure plane in the regions corresponding to the continuous tone copy. Thereupon, the etching resist is photographically developed such that the developed resist will have varying thickness of etching resist in proportion to the continuous tone and line copy.

In accordance with one variant of our improved process, both the continuous tone copy and the line copy are mounted in the required registry relative to each other on a fluorescent background at the copying plane, while in accordance with a further variant, the line copy is reproduced on a transparency and is used as an overlay in direct contact with the photosensitive etching resist at the exposure plane while the continuous tone copy is mounted on the fluorescent background at the copying plane.

The above brief description, as well as further objects, features and advantages of the present invention will be more fully appreciated by reference to the following detailed description of presently preferred, but nonetheless illustrative processes in accordance with the present invention, when taken in conjunction with the accompanying drawings, wherein.

Figures 1, 2, 3:
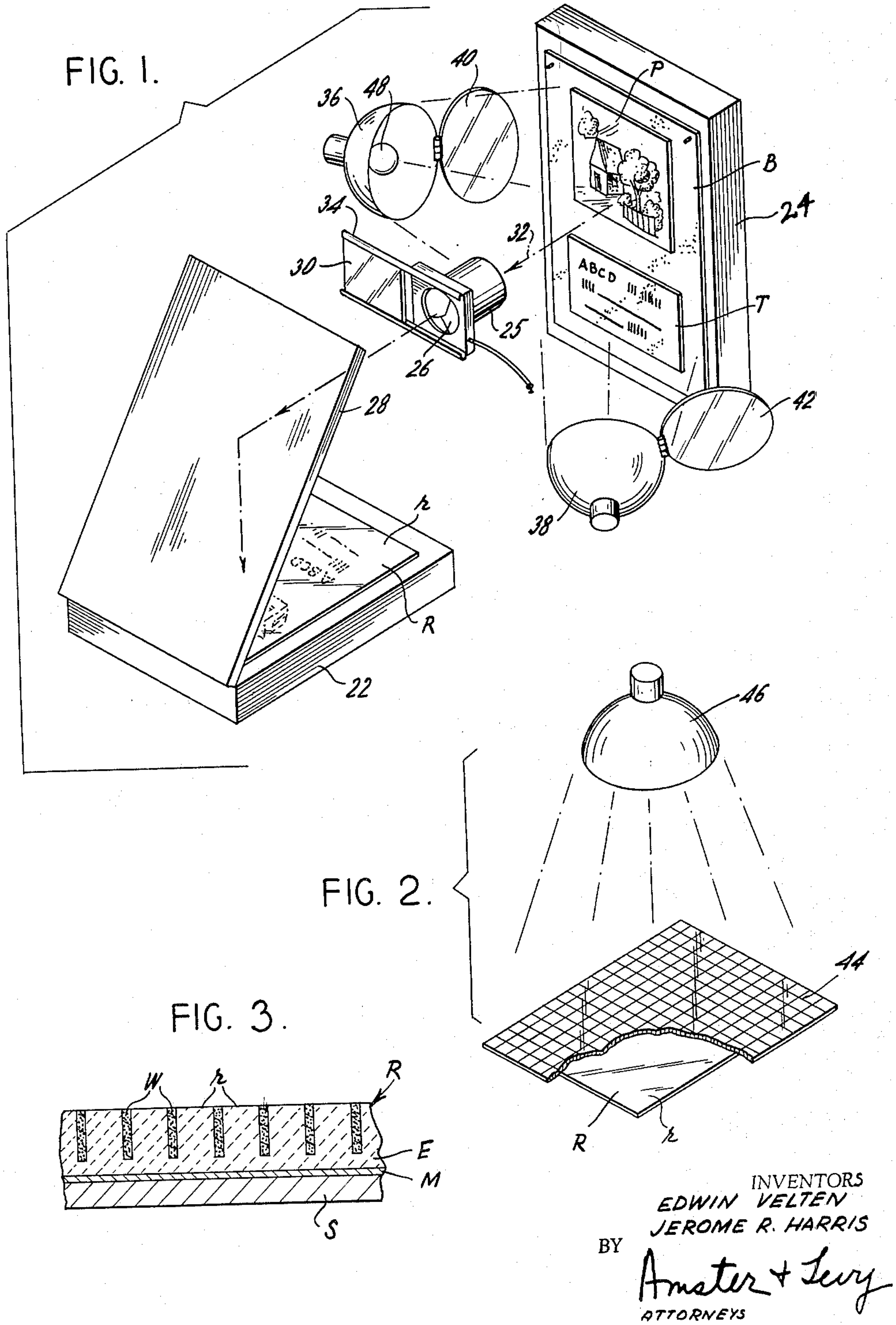
FIG. 1 is a perspective schematic and diagrammatic showing of typical apparatus for exposing a photosensitive gravure etching resist in accordance with the present invention, shown during the exposure of the copy to a white light source in the ultra-violet and near ultra-violet portions of the spectrum.
FIG. 2 is a perspective showing of the preliminary exposure of the photosensitive gravure etching resist through a grid-like screen to an incandescent light source to provide cell walls.
FIG. 3 is an enlarged fragmentary sectional view of a typical photosensitive gravure etching resist showing the emulsion, the protective membrane, and the film base support, with the emulsion having developed and hardened regions indicated by the dotted areas corresponding to the number and location of the cell walls.
Figure 5:
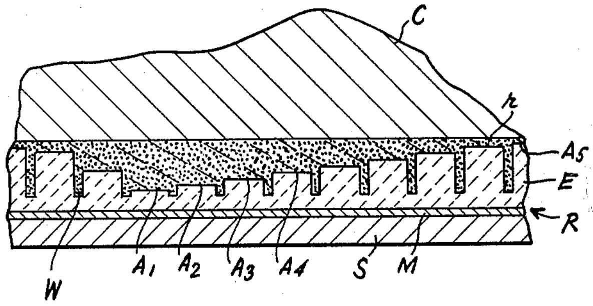
Figures 6, 7:
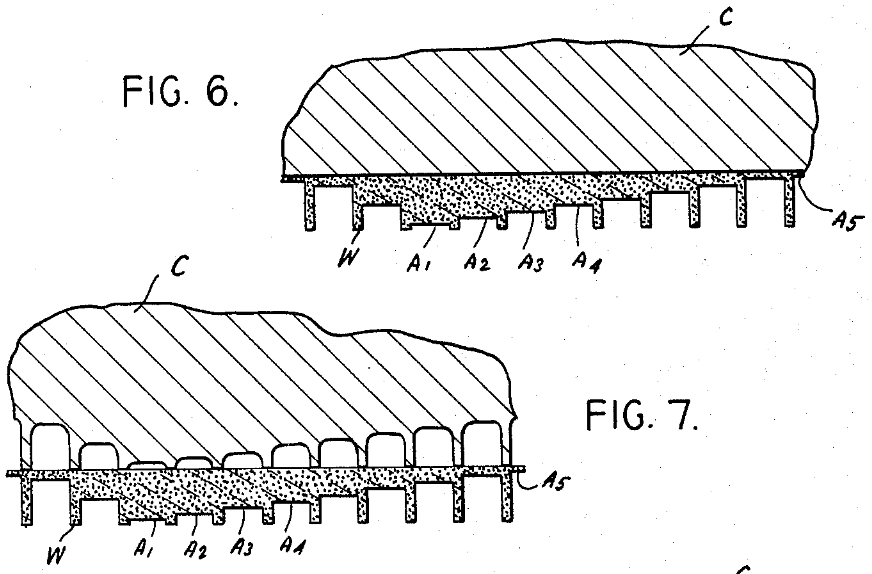
Figures 8, 9:
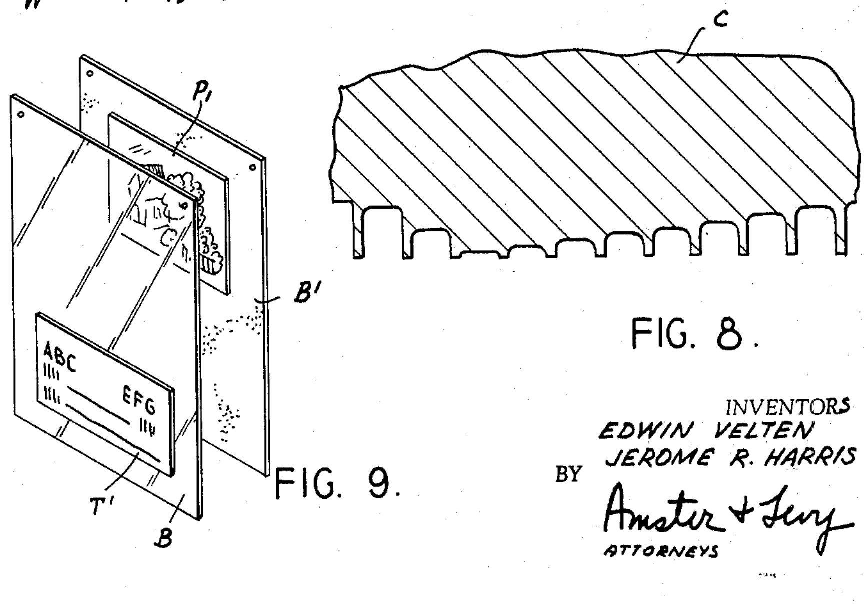
Figures 10, 11, 12:
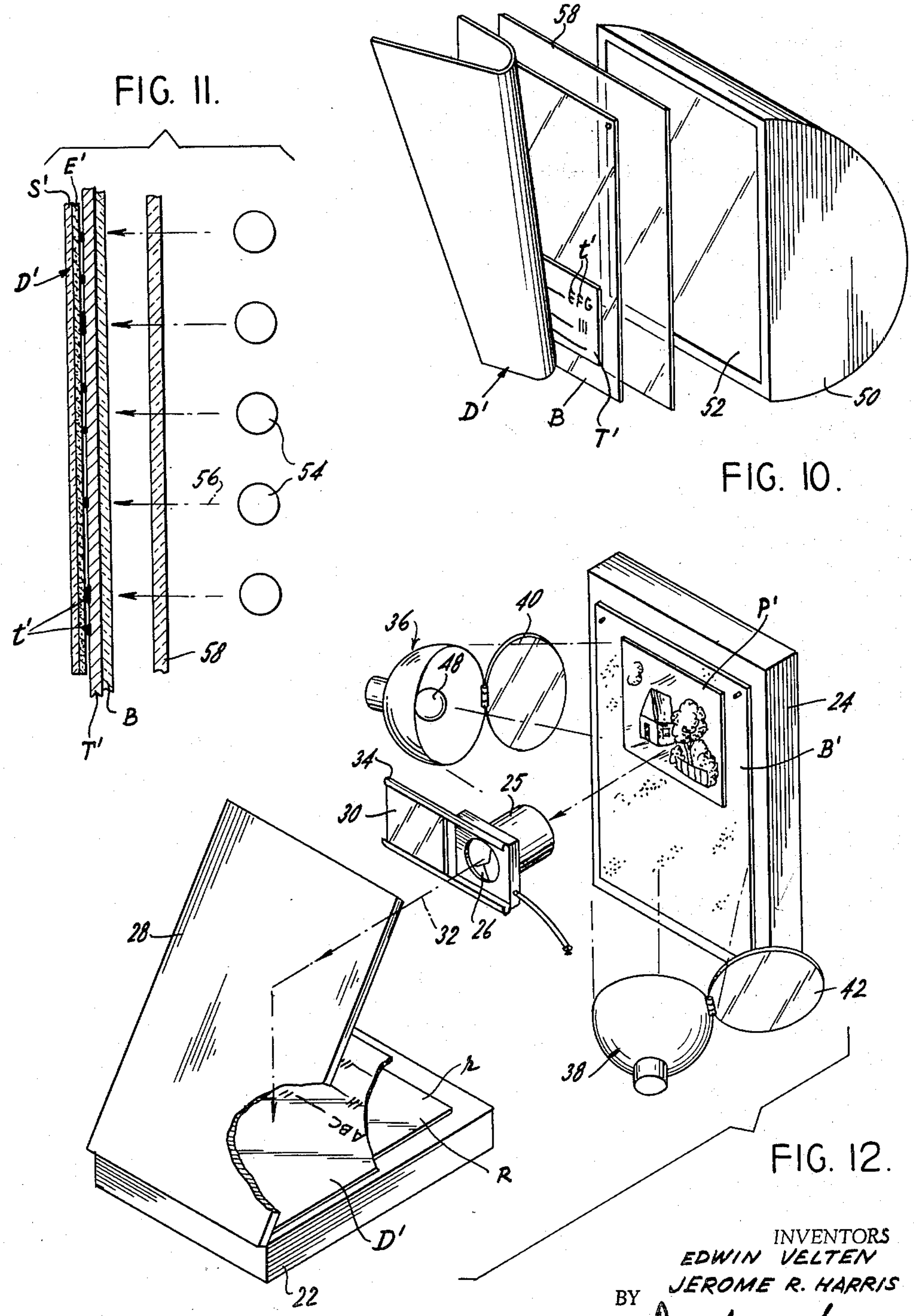

FIG. 5 is an enlarged fragmentary sectional view, showing the developed gravure etching resist applied to the printing cylinder preliminary to the stripping of the film base support and the protective membrane, with the dotted areas corresponding to emulsion regions which have the tanned or hardened gelatin and with the dashed areas corresponding to emulsion regions which have not been developed and where the gelatin is not tanned or hardened;

FIG. 6 is a view similar to FIG. 5 after removal of the film base support, the protective membrane and hot water development, the latter removing the undeveloped regions of the gelatine which were not tanned or hardened incident to exposure and subsequent development;

FIG. 7 is a sectional view similar to FIG. 6, but showing the printing cylinder after etching and prior to removal of the gravure etching resist;

FIG. 8 is a view similar to FIG. 7, showing the printing cylinder after removal of the gravure etching resist;

FIG. 9 is a perspective view of typical continuous tone and line copy for the preparation of a gravure etching resist in accordance with a further process demonstrating features of the present invention, the copy including positive continuous tone reflective copy mounted on a fluorescent board and the line copy mounted on a transparent overlay;

FIG. 10 is a perspective view of a typical assembly for exposing the line copy in accordance with this further process;

FIG. 11 is a sectional view, partially schematic showing the exposure technique for the line copy; and, FIG. 12 is a perspective schematic and diagrammatic showing similar to FIG. 1, but illustrating the set-up procedure for the further process for preparing the gravure etching resist in accordance with the present invention.

Referring now specifically to the drawings, and in particular to FIG. 1, there is shown typical exposure apparatus for processing a photosensitive gravure etching resist for a gravure cylinder or plate from continuous tone copy and line copy in accordance with the present invention, the apparatus being generally designated by the reference numeral 20 and only being illustrated diagrammatically in the interest of simplicity and brevity. It will be appreciated by those skilled in the art, that various types of equipment, all of which are generally known, may be employed for exposing the photosensitive gravure etching resist in accordance with the present invention and that such equipment is subject to a wide latitude of modification, change and variation. In the typical, but nonetheless illustrative apparatus 20, there is provided a vacuum back or frame 22 which has mounted thereon a photosensitive gravure etching resist R which is disposed in an exposure plane with the emulsion side *r* thereof being uppermost. In FIG. 3, there is seen a typical cross section through the etching resist R which is seen to include an emulsion E of gelatin containing an orthochromatic sensitized silver halide, a protective membrane M of waterproof material which protects the gelatin emulsion during subsequent lay-down of the resist on a cylinder and is removed by a solvent prior to hot water development, and a polyester base backed with a red anti-halation layer serving as a removable film base support S. The photosensitive resist material is commercially available from Du Pont under the trademark Cronar Rotofilm and from Gevaert under the trademark Rotargo.

In this illustrative process, both the continuous tone copy and the line copy, the latter including both type and line representations, are mounted in the proper registry with each other on a copy board or back 24 in a common copying plane. Specifically, the positive continuous tone photograph in the form of a velox print which will not fluoresce under black light excitation and is generally designated by the letter P, is mounted on a background board B which fluoresces under black light excitation. The line and/or type generally designated by the letter T, is printed on a reproduction paper which has the same fluorescent properties and is mounted in the proper position on the mounting board B in relation to the positive continuous tone photograph or velox P. Appropriate mounting boards B are commercially available from the Strathmore Paper Co. and include a white board having impregnated therein a brightening for fluorescent pigment which fluoresces with a bluish-white light which is most appropriate for exposure of the photosensitive gravure etching resist R. Provision may be made, as is generally well understood in the art, for properly keying or registering the continuous tone copy P and the line copy T relative to each other in accordance with the composition of the final page which is to be reproduced from the printing cylinder.

The apparatus 20 includes a system of lenses, generally designated by the reference numeral 25, a shutter 26 which is disposed therebehind, and a mirror 28 which is arranged to reverse the positive copy so that it is readable from the emulsion side *r* of the photosensitive gravure resist R, as shown by the dotted representation thereon. Provision is further made in the optical system for selectively introducing a filter 30 along the light transmission path 32. In this illustrative showing, the filter 30 is mounted on a guideway 34 such that the filter 30 may be moved from the offset position illustrated in FIG. 1 to one side of the light transmission path 32 to a position coextensive with the shutter 26 and along the path 32. Disposed at opposite sides of the light transmission path 32 are a pair of light sources 36, 38, each having filters 40, 42 movably associated therewith. The filters 40, 42 can be moved from the inoperative position illustrated in FIG. 1 to an operative position overlying the light sources, as will be subsequently described. It is to be emphasized that the exposure camera or apparatus 20 and light setup is merely an illustrative and diagrammatic showing and is intended to be typical of known equipment of this type.

Preliminary to the mounting of the photosensitive gravure etching resist R at the exposure or image plane in the camera 20, the resist R is provided with a conventional gravure screen which is achieved by preliminary exposure thereof to a white or yellow light source. This preliminary exposure is shown diagrammatically in FIG. 2 wherein it is seen that the photosensitive gravure etching resist R is disposed beneath a screen 44 with the emulsion side *r* in intimate contact with the screen 44 and in a position to be exposed to light emanating from a white or yellow light source 46. The screen 44 has opaque squares and transparent lines, with the line separation both horizontally and vertically being determined by the ultimate cell size for the printing cylinder or plate and usually being of the order of 150 lines per inch. A typical screen exposure may be for approximately 20 seconds with the white or yellow light source 46 being disposed at a spacing of approximately eight feet and being a 25 watt bulb. Such pre-screening will result in the provision of walls for the printing cells, as generally designated by the reference character W in FIGS. 3 and 5.

With the positive continuous tone and line copy P, T and the pre-screened photosensitive gravure etching resist R in position, as illustrated in FIG. 1 of the drawings, all of the copy is exposed to a light source. This may be provided by the mounting bulbs 48 in the light sources 36, 38 of General Electric or Sylvania BL type which provide a white light output which is high in the ultra-violet and near ultra-violet portions of the spectrum. This first exposure to the white light source exposes the photosensitive gravure etching resist R in direct proportion to the tonal values of the continuous tone reflective copy P and is of a duration to provide for full exposure of the continuous tone reflective copy P in accordance with the tonal values thereof. However, the background areas which are to be dropped out and which correspond to the fluorescent background provided by the mounting board B and the reproduction paper for the line copy T is not adequately exposed. The first exposure for the continuous tone reflective copy P results in a photographic exposure in a negative image at the photosensitive gravure etching resist R. In typical apparatus, the white light sources 36, 38 may be disposed at approximately eighteen inches to two feet from the copying plane and the exposure may be of a duration of the order of thirty-five seconds using four forty watt General Electric BL fluorescent tubes.

After the first exposure for the continuous tone reflective copy P, the filter 30 is introduced into the optical system of the camera 20 which is appropriate to cut out all of the ultra-violet light and near ultra-violet light reflected from the surface of the mounting or copying board B and the continuous tone reflective copy P. A typical filter 30 would be a Kodak Wratten 2A filter which is of relatively light yellow color. In the illustrative exposure set up, provision is made to use the bulbs 48 to provide a substantially pure ultra-violet light source for the full exposure of the photosensitive gravure etching resist R in the drop-out area and a corresponding negative image of the line copy. This is accomplished by making the filters 40, 42 of Corning No. 5840 filter material which is deep violet in color and which, when placed over the respective light sources 36, 38, will provide a substantially pure ultra-violet light on the copying plane. The second exposure of the copy to the ultra-violet light source will bring about some absorption of the ultra-violet portion of the spectrum in the areas corresponding to the fluorescing material of the mounting board B and of the reproduction paper with the reflected light being in a different portion of the spectrum and being transmitted through the optical system 24 including the filter 30 to the photosensitive gravure etching resist R to fully expose the resist in the drop-out areas corresponding to the fluorescent surface. The ultra-violet light which impinges upon the continuous tone reflective copy P and on the line or type copy T experiences no substantial spectral change when reflected. Accordingly, there is no exposure of the resist R in the regions corresponding to the continuous tone reflective copy and the line or type representations. A typical second exposure is for a period of two minutes employing the previously described light sources with the filters 40, 42 disposed thereover.

Following the second exposure, the exposed photosensitive gravure etching resist is removed from the vacuum back or frame 22 and photographically processed by developing, rinsing, fixing, washing, final rinsing and drying in accordance with techniques which are generally well understood and described for Rotofilm in the Du Pont Graphic Art Technical Bulletin No. 22, dated August 17, 1961.

Figure 4:
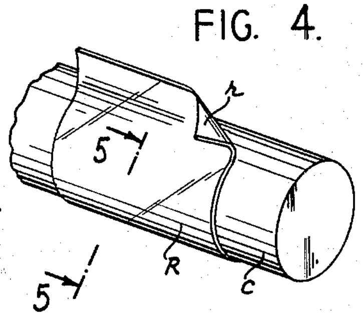
FIG. 4 is a fragmentary perspective view illustrating the laydown of the developed gravure etching resist onto a printing cylinder, with the emulsion in contact with the periphery of the printing cylinder.

After photographic processing, the developed gravure resist R is laid down on the copper as shown diagrammatically in FIG. 4 for the printing cylinder C, with the emulsion side *r* of the resist R in contact with the printing surface of the cylinder C, as seen best in FIG. 5. Lay down of the resist R onto the copper is essentially the same as for carbon tissue and accordingly further description is dispensed with in the interest of brevity.

As seen in FIG. 5, the developed emulsion E will have areas which are substantially completely exposed which correspond to dropout and cell wall regions, will have further areas which are partially exposed in accordance with the tonal values of the continuous tone copy, and will have further areas which are exposed only to a minimum and will correspond to the shadow, type or lines in the copy. Of course the developed gravure etching resist R in the emulsion layer E will have a cellular structure provided in the first instance by the pre-screening as shown and described in connection with FIGS. 1 and 2. In illustrative showing of FIG. 5, a typical cell wall is designated by the letter W, a typical drop-out area corresponding to a white background is designated by the letter $A_1$, areas of different tone values are designated by the letters $A_2$, $A_3$ and $A_4$ and the shadow, type or line areas having minimum thicknesses of tanned or hardened emulsion are designated by the letter $A_5$. As is understood, the gravure etchants or irons will penetrate the final etching resist in relationship to the respective thicknesses of the developed or tanned emulsion in the plural cells, with the minimum penetration being in the drop-out areas $A_1$ and the maximum penetration being in the shadow or line areas $A_5$.

After laydown, the printing cylinder C is placed in position for hot water development and while the cylinder is rotated an appropriate solvent, such as diacetone alcohol is poured over the cylinder C so as to wet the resist quickly and uniformly. After the appropriate exposure to the solvent at room temperature protective membrane M will dissolve from the resist. Thereupon the gelatin layer E of the resist R is developed for approximately 5 minutes with hot water and at a temperature in the range of 130° up to 140° F. with appropriate provision for removal of the unhardened gelatin (see FIG. 6). After removal of the undeveloped gelatin, the cylinder is slowly cooled to approximately 70° F. with cold water and the resist is then dried by the application of 70° ethyl alcohol.

The staging and etching procedures are substantially no different than those employed in connection with carbon tissue and accordingly will only be briefly described. Using etchants, such as ferric chloride, it is necessary to expose the gravure cylinder C to multiple etchants of varying Baumés to obtain good tonal values for the continuous tone copy and a sufficient deep edge for proper retention of type, line and shadow areas. Initially, the type and line areas of the resist are staged by applying thereto an acid-resistant coating, such as asphaltum. The areas of the resist corresponding to the continuous tone copy are subjected to multiple etchants of varying Baumés to reproduce the tonal areas of the original copy. Thereupon, the acid-resistant asphaltum is removed from the type and line areas of the resist and the already etched continuous tone areas are staged out. After such staging, the areas corresponding to the type and line representations are etched, once again using multiple etchants of varying Baumés to assure sufficient depth of copper removal for proper reproduction of the type and line representations (see FIG. 7).

After the etching is completed, and the staging lacquers are removed with appropriate solvents, the printing cylinder C should then be flooded with a weak acetic acid solution to permit the removal of the used resist by washing and light rubbing. The cylinder C is then cleaned and prepared for printing (see FIG. 8).

Although the above described procedure represents a notable advance in this art, there are practical problems in obtaining good reproductions of the type and line representations due to the inherent reflection of light from such type or line representations which cause undesired exposure in the corresponding regions of the resist R at the exposure plane. The inherent exposure of the emulsion in the regions corresponding to the black lines and/or type is somewhat magnified due to the less than perfect preparation of the black type material in the first instance; and under the most ideal conditions and with the best possible black line and type representations, there is still approximately ten percent of light reflection from the copy at the copying plane to the photosensitive gravure etching resist R at the exposure plane. There now follows a description of a further exposure process wherein the positive continuous tone copy is disposed at the copying plane during exposure and the type and line copy is disposed at the exposure plane which, by experience, substantially eliminates reflected light in the type and line areas.

Specifically, and as seen in FIG. 9, in this illustrative embodiment, the positive continuous tone reflective copy or velox P′ is mounted on a fluorescent board B′ as previously described, while the line and type copy T′ is prepared on any paper which has a good capacity to accept ink, such as a single weight Relyon paper made by Ludlow Paper Company. The type and line copy T′ is then pasted up on a transparent overlay B, as of acetate, B which is appropriately keyed or registered with respect to the positive continuous tone copy P′. This method of preparing the continuous tone and line copy does not represent an appreciable departure for the composition group. With the copy prepared in this manner, the continuous tone copy P′ on the fluorescent board B′ is in condition for mounting on the copy board or back 24 (see FIG. 12). However, the type and line copy T′ on the acetate B is used to prepare a transparency D′ which serves as an overlay on the photosensitive gravure etching resist R in contact with the emulsion sides *r* thereof and held thereagainst by the action of the vacuum back 22.

Referring now to FIGS. 10 and 11 there will be described the typical but nonetheless illustrative procedure for preparing the transparency D′ using so-called autopositive or direct positive film manufactured by Eastern Kodak and Du Pont. Both of these films include a clear polyester base and an emulsion which is normally black and of a high order of opacity if developed without exposure to a green or yellow light source. In regions where there is substantially full penetration of light from a green or yellow light source and subsequent development, there is no image and there is reproduced a corresponding area of transparency. With this type of autopositive or direct-positive film, it is possible to produce an exceptionally black line or type representations which have a minimum optical density of 3.0. As seen in these figures, there is provided a light housing 50 having a window 52 and containing a bank of green lights 54 (see FIG. 11). The green light, as indicated by the directional arrows 56, is passed through a yellow filter 58 and through the acetate B having the line or type copy thereon, designated by the letter *t′*, in contact with the emulsion side E′ of the direct-positive or auto-positive film D′, which has a base side S′ remote from the light source 54. The use of green fluorescent lights 54 as the light source requires that the yellow filter 52 be interposed between the light source and the backside of the copy to filter out the blue and ultra-violet portions of the spectrum. After blasting the required amount of green light through the acetate B and repro or line copy, the direct-positive or auto-positive film is developed with an appropriate developer supplied by the manufacturer. There is produced an image in black on a transparency D′ corresponding precisely to the line and type copy and in proper position for reading through the base side S′. It is noted that if the type were placed in the direction facing the light source 54, there would have been obtained a reverse image and a poor reproduction. However, the disclosed arrangement produces a transparency D′ which reads in the proper direction from the side of the base S′.

The auto-positive transparency D′ is then superimposed over the photosensitive gravure etching resist R at the exposure or image plane, with the copy thereon being readable when looking into the optical system through the transparency D′ and onto the gravure resist R, as shown by the representative lettering. It is in direct contact with the resist R. As illustrated, the transparency D′ is made somewhat larger than the gravure resist R such that the action of the vacuum back or frame 22 will establish an intimate contact between the transparency D′ serving as an overlay for the gravure resist R such that there will be no undercutting of the reproduced image.

Referring now to FIG. 12, it will be seen that the copy is in the proper registry for exposure of the photosensitive resist R, with the positive tone reflective copy P′ on the fluorescent mounting board B′ at the copying plane and with the line copy reproduced on the transparency D′ and substantially in the exposure plane. The exposure technique involves the first exposure to a white light source high in the ultra-violet and near ultra-violet portions of the spectrum to fully expose the photo-sensitive gravure etching resist R in a negative image in direct proportion to the tonal values of the continuous tone copy, followed by a second exposure with the filter interposed along the light transmission path 32 and is identical to that previously described. Still further, the subsequent development and lay down of the etching resist R on the printing cylinder or plate follow the procedures outlined heretofore. However, the etching of the printing cylinder or plate is materially simplified. Specifically, the areas of the printing cylinder which are not to be etched at all are staged out with asphaltum and both the continuous tone and line copy are simultaneously etched by using etchants of varying Baumés. Simultaneous etching of the continuous tone copy and line copy is possible in that there is no fogging of the type areas which would otherwise inhibit the etching action. It is actually possible to obtain minimum reproducible thicknesses of the tanned gelatin in areas corresponding to type and line reproductions which are readily penetrated as the etching procedure goes forward. Thus, the gradual and progressive etching suitable for reproduction of good tonal values is eminently suitable for the etching of type.

Further, in some instances, it may be desirable to follow the second exposure during which the etching resist R is fully exposed in the drop out regions to provide a negative image of the line copy to a still further exposure to black light, with the transparency T′ removed from the photosensitive gravure etching resist R. Such third exposure to black light for a predetermined time, of the order of five seconds, will assure the provision of a controlled thin film of hardened resist over the type and black line areas which will preclude the etching irons from direct contact with the cylinder C and the consequent uncontrolled etching, possible undercutting of the copper and destruction of the cell walls.

In accordance with this illustrative process, if there is no continuous tone material, the copy board 24 may be covered with any appropriate light-reflecting material and a single exposure to a white light source will effectively expose the background of the photosensitive gravure etching resist R through the transparency T′. Thereupon, the resist may be processed as previously described.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What we claim is:

1. A method for preparing a gravure etching resist for a gravure cylinder from continuous tone copy and line copy including the steps of mounting said continuous tone copy and said line copy in the proper registry relative to each other with at least said continuous tone copy on a fluorescent background at a copying plane and with a photosensitive etching resist at an exposure plane spaced from said copying plane, exposing said copy to a white light source having a high content in the ultra-violet and near ultra-violet portions of the spectrum to fully expose said photosensitive etching resist in a negative image in direct proportion to the tonal values of said continuous tone copy and to partially expose said photosensitive etching resist in a drop-out region corresponding to said fluorescent background, placing a filter between said copying plane and said exposure plane to cut off reflected light from said copying plane in the ultra-violet and near ultra-violet portion of the spectrum, exposing said continuous tone copy and said fluorescent background to a substantially ultra-violet light source to fully expose said photosensitive etching resist in said drop-out region and to provide a negative image of said line copy, and thereafter photographically developing said photosensitive etching resist such that the developed resist will produce a gravure etching resist having varying thicknesses of said gravure etching resist hardened in proportion to said continuous tone and line copy.

2. A method according to claim 1 wherein said etching resist is exposed through a grid-like screen to an incandescent light source preliminary to exposure to said white light source.

3. In the preparation of a gravure etching resist for a gravure cylinder from continuous tone copy and line copy, the steps of mounting said continuous tone copy and said line copy in the proper registry relative to each other with at least said continuous tone copy on a fluorescent background at a copying plane and with a photosensitive etching resist at an exposure plane spaced from said copying plane, exposing said copy to a light source in the ultra-violet and near ultra-violet portions of the spectrum to expose said photosensitive etching resist in a negative image in direct proportion to the tonal values of said continuous tone copy, placing a filter between said copying plane and said exposure plane to cut off reflected light from said copying plane in the ultra-violet and near ultra-violet portion of the spectrum, and exposing said continuous tone copy and said fluorescent background to a substantially ultra-violet light source to fully expose said photosensitive etching resist in a drop-out region corresponding to said fluorescent background and to provide a negative image of said line copy.

4. A method for preparing a gravure etching resist for a gravure cylinder from continuous tone copy and line copy including the steps of mounting said continuous tone copy and said line copy in the proper registry relative to each other with at least said continuous tone copy on a fluorescent background at a copying plane and with a photosensitive etching resist at an exposure plane spaced from said copying plane, exposing said copy to a white light source having a high content in the ultra-violet portions of the spectrum to fully expose said photosensitive etching resist in a negative image in direct proportion to the tonal values of said continuous tone copy and to partially expose said photosensitive etching resist in a drop-out region corresponding to said fluorescent background, placing a filter between said copying plane and said exposure plane to cut off reflected light from said copying plane in the ultra-violet and near ultra-violet portions of the spectrum, exposing said continuous tone copy and said fluorescent background to a substantially ultra-violet light source to fully expose said photosensitive etching resist in said drop-out region and to provide a negative image of said line copy, thereafter photographically developing said photosensitive etching resist such that the developed resist will produce a gravure etching resist having varying thicknesses of said gravure etching resist hardened in proportion to said continuous tone and line copy, and applying said gravure etching resist to the periphery of said gravure cylinder.

5. A method for preparing a gravure etching resist for a gravure cylinder from continuous tone copy and line copy including the steps of mounting said continuous tone copy and said line copy in the proper registry relative to each other on a fluorescent background at a copying plane, disposing a photosensitive etching resist at an exposure plane spaced from said copying plane, exposing said copy to a light source in the ultra-violet and near ultra-violet portions of the spectrum to fully expose said etching resist in a negative image in direct proportion to the tonal values of said continuous tone copy and to partially expose said etching resist in a drop-out region corresponding to said fluorescent background, placing a filter between said copying plane and said exposure plane to cut off reflected light from said copying plane in the ultra-violet and near ultra-violet portions of the spectrum, exposing said copy to a substantially ultra-violet light source to fully expose said etching resist in said drop-out region and to provide a negative image of said line copy, and thereafter photographically developing said etching resist such that the developed resist will produce a gravure etching resist having varying thicknesses of etching resist hardened in proportion to said continuous tone and line copy.

6. In the preparation of a gravure etching resist for a gravure cylinder from continuous tone copy and line copy, the steps of mounting said continuous tone copy and said line copy in the proper registry relative to each other on a fluorescent background at a copying plane, disposing a photosensitive gravure etching resist at an exposure plane spaced from said copying plane, exposing said copy to a light source an ultra-violet and near ultra-violet portions of the spectrum to fully expose said etching resist in a negative image in direct proportion to the tonal values of said continuous tone copy and to partially expose said etching resist in a drop-out region corresponding to said fluorescent background, placing a filter between said copying plane and said exposure plane to cut off reflected light from said copying plane in the ultra-violet and near ultra-violet portion of the spectrum, and exposing said copy to a substantially ultra-violet light source to fully expose said etching resist in said drop-out region and to provide a negative image of said line copy.

7. A method for preparing a gravure etching resist for a gravure cylinder from continuous tone copy and line copy including the steps of mounting said continuous tone copy and said line copy in the proper registry relative to each other on a fluorescent background at a copying plane, exposing a photo-sensitive gravure etching resist to incandescent light to form a grid-like screen thereon when subsequently developed, disposing said etching resist at an exposure plane spaced from said copying plane, exposing said copy to a light source an ultra-violet and near ultra-violet portions of the spectrum to fully expose said etching resist in a negative image in direct proportion to the tonal values of said continuous tone copy and to partially expose said etching resist in a drop-out region corresponding to said fluorescent background, placing a filter between said copying plane and said exposure plane to cut off reflected light from said copying plane in the ultra-violet and near ultra-violet portion of the spectrum, exposing said copy to a substantially ultra-violet light source to fully expose said etching resist in said drop-out region and to provide a negative image of said line copy, and thereafter photographically developing said etching resist such that the developed resist will have said grid-like screen defining cells and varying thicknesses of etching resist in said cells hardened in proportion to said continuous tone and line copy.

8. A method for preparing a gravure etching resist for a gravure cylinder from continuous tone copy and line copy including the steps of mounting said continuous tone copy on a fluorescent background at a copying plane, preparing a transparency containing said line copy, disposing a photosensitive gravure etching resist at an exposure plane spaced from said copying plane, overlaying said etching resist with said transparency, exposing said copy to a light source in the ultra-violet and near ultra-violet portions of the spectrum to fully expose said etching resist in a negative image in direct proportion to the tonal values of said continuous tone copy and to partially expose said etching resist in a drop-out region corresponding to said fluorescent background, placing a filter between said copying plane and said exposure plane to cut off reflected light from said copying plane in the ultra-violet and near ultra-violet portion of the spectrum, exposing said fluorescent background to a substantially ultra-violet light source to fully expose said etching resist in said drop-out region and to provide a negative image of said line copy, and thereafter photographically developing said etching resist such that the developed resist will have varying thickneses of etching resist hardened in proportion to said continuous tone and line copy.

9. In the preparation of a gravure etching resist for a gravure cylinder from continuous tone copy and line copy, the steps of mounting said continuous tone copy on a fluorescent background at a copying plane, preparing a transparency containing said line copy, disposing a photosensitive gravure etching resist at an exposure plane spaced from said copying plane, overlaying said etching resist with said transparency exposing said copy to a light source in the ultra-violet and near ultra-violet portions of the spectrum to fully expose said etching resist in a negative image in direct proportion to the tonal values of said continuous tone copy and to partially expose said etching resist in a drop-out region corresponding to said fluorescent background, placing a filter between said copying plane and said exposure plane to cut off reflected light from said copying plane in the ultra-violet and near ultra-violet portion of the spectrum, and exposing said fluorescent background to a substantially ultra-violet light source to fully expose said etching resist in said drop-out region and to provide a negative image of said line copy.

10. A method for preparing a gravure etching resist for a gravure cylinder from continuous tone copy and line copy including the steps of mounting said continuous tone copy on a fluorescent background at a copying plane, preparing a transparency containing said line copy, exposing a photosensitive gravure etching resist to incandescent light to form a grid-like screen thereon when subsequently developed, disposing said etching resist at an exposure plane spaced from said copying plane, overlaying said etching resist with said transparency, exposing said copy to a light source in the ultra-violet and near ultra-violet portions of the spectrum to fully expose said etching resist in a negative image in direct proportion to the tonal values of said continuous tone copy and to partially expose said etching resist in a drop-out region corresponding to said fluorescent background, placing a filter between said copying plane and said exposure plane to cut off reflected light from said copying plane in the ultra-violet and near ultra-violet portion of the spectrum, exposing said fluorescent background to a substantially ultra-violet light source to fully expose said etching resist in said drop-out region and to provide a negative image of said line copy, and thereafter developing said etching resist such that the developed resist will have said grid-like screen defining cells and varying thicknesses of etching resist in proportion to said continuous tone and line copy.

11. A method for preparing a gravure etching resist for a gravure cylinder from line copy including the steps of establishing a copying plane which is light reflective, preparing a transparency containing said line copy, disposing a photosensitive gravure etching resist having a gelatin film which when developed is tanned in proportion to light exposure at an exposure plane spaced from said copying plane, overlaying said etching resist with said transparency in intimate contact therewith, and illuminating said copying plane with a light source such that light is reflected from said copying plane and exposes said etching resist through said transparency to expose said etching resist in a drop out region surrounding said line copy.

12. A method according to claim 11 wherein said photosensitive gravure etching resist is preliminarily exposed to an incandescent light source to form a grid-like screen providing cell walls when subsequently developed.

13. A method for preparing a gravure etching resist for a gravure cylinder from line copy including the steps of establishing a copying plane which is light reflective, preparing a transparency containing said line copy, disposing a photo-sensitive gravure etching resist having a gelatin film which when developed is tanned in proportion to light exposure at an exposure plane spaced from said copying plane, overlaying said etching resist with said transparency in intimate contact therewith, illuminating said copying plane with a light source such that light is reflected from said copying plane and exposes said etching resist through said transparency to expose said etching resist in a drop out region surrounding said line copy, and thereafter photographically developing said etching resist such that the developed resist will have a maximum thickness of tanned gelatin in the region surrounding said line copy.

14. A method according to claim 13 wherein said photosensitive gravure etching resist is preliminarily exposed to an incandescent light source to form a grid-like screen providing cell walls when subsequently developed.

15. A method for preparing a gravure etching resist for a gravure cylinder from line copy including the steps of establishing a copying plane which is light reflective, preparing a transparency containing said line copy, disposing a photosensitive gravure etching resist having a gelatin film which when developed is tanned in proportion to light exposure at an exposure plane spaced from said copying plane, overlaying said etching resist with said transparency in intimate contact therewith, illuminating said copying plane with a light source such that light is reflected from said copying plane and exposes said etching resist through said transparency to expose said etching resist in a drop out region surrounding said line copy, and exposing said etching resist with said transparency removed to a light source to provide a controlled thickness of resist when developed over the negative image of said line copy.

16. A method for preparing a gravure etching resist for a gravure cylinder from continuous tone copy and line copy including the steps of mounting said continuous tone copy on a fluorescent background at a copying plane, preparing a transparency containing said line copy, disposing said etching resist at an exposure plane spaced from said copying plane, overlaying said etching resist with said transparency, exposing said copy to a white light source having a high content in the ultra-violet and near ultra-violet portions of the spectrum to fully expose said etching resist in a negative image in direct proportion to the tonal values of said continuous tone copy and to partially expose said etching resist in a drop-out region corresponding to said fluorescent background, placing a filter between said copying plane and said exposure plane to cut off reflected light from said copying plane in the ultra-violet and near ultra-violet portion of the spectrum, exposing said fluorescent background to a substantially ultra-violet light source to fully expose said etching resist in said drop-out region and to provide a negative image of said line copy, and exposing said etching resist with said transparency removed to said ultra-violet light source to provide a controlled thickness of resist when developed over said negative image.

17. A method for preparing a gravure etching resist for a gravure cylinder from continuous tone copy and line copy including the steps of mounting said continuous tone copy on a fluorescent background at a copying plane, preparing a transparency containing said line copy, exposing a photosensitive gravure etching resist to incandescent light to form a grid-like screen thereon when subsequently developed, disposing said etching resist at an exposure plane spaced from said copying plane, overlaying said etching resist with said transparency, exposing said copy to a white light source having a high content in the ultra-violet and near ultra-violet portions of the spectrum to fully expose said etching resist in a negative image in direct proportion to the tonal values of said continuous tone copy and to partially expose said etching resist in a drop-out region corresponding to said fluorescent background, placing a filter between said copying plane and said exposure plane to cut off reflected light from said copying plane in the ultra-violet and near ultra-violet portion of the spectrum, exposing said fluorescent background to a substantially ultra-violet light source to fully expose said etching resist in said drop-out region and to provide a negative image of said line copy, exposing said etching resist with said transparency removed to said ultra-violet light source to provide a controlled thickness to resist when developed over said negative image of said line copy, and thereafter developing said etching resist such that the developed resist will have said grid-like screen defining cells and varying thicknesses of etching resist in proportion to said continuous tone and line copy and said controlled thickness of resist over said negative image of said line copy.

References Cited by the Examiner

UNITED STATES PATENTS 3,085,877 4/63 Reid ------------------ 96—41

OTHER REFERENCES

Cartwright et al.: Rotogravure, 1956, McKay Publ. Co., Inc., Lyndon, Kentucky, pp. 165–174.

NORMAN G. TORCHIN, *Primary Examiner.*